United States Patent
Lakis et al.

(10) Patent No.: US 11,701,736 B2
(45) Date of Patent: Jul. 18, 2023

(54) SYSTEMS AND METHODS FOR MAKING A COMPOSITE THICKNESS METAL PART

(71) Applicant: Wiegel Tool Works, Inc., Wood Dale, IL (US)

(72) Inventors: Mark Andrew Lakis, Chicago, IL (US); Joseph Vincent Manschula, Wonder Lake, IL (US)

(73) Assignee: Wiegel Tool Works, Inc., Wood Dale, IL (US)

( * ) Notice: Subject to any disclaimer, the term of this patent is extended or adjusted under 35 U.S.C. 154(b) by 0 days.

(21) Appl. No.: 17/490,375

(22) Filed: Sep. 30, 2021

(65) Prior Publication Data

US 2023/0096278 A1 Mar. 30, 2023

(51) Int. Cl.
*B23K 20/10* (2006.01)
*B26F 1/02* (2006.01)
*B23K 20/24* (2006.01)

(52) U.S. Cl.
CPC .............. *B23K 20/10* (2013.01); *B23K 20/24* (2013.01); *B26F 1/02* (2013.01)

(58) Field of Classification Search
CPC ... B23K 20/10–106; B23K 20/24; B26F 1/02; B29C 65/08
USPC ............. 228/1.1, 110.1, 160; 156/73.1–73.4, 156/580.1–580.2
See application file for complete search history.

(56) References Cited

U.S. PATENT DOCUMENTS

| | | | |
|---|---|---|---|
| 4,431,470 A | 2/1984 | Schubert | |
| 5,295,296 A | 3/1994 | Hagiwara et al. | |
| 5,476,208 A * | 12/1995 | Fiddes | B23K 20/10 228/5.7 |
| 5,942,314 A * | 8/1999 | Fisher | B23K 20/103 228/2.1 |
| 7,342,771 B2 | 3/2008 | Kobayashi et al. | |
| 8,368,882 B2 | 2/2013 | Opalsky et al. | |
| 8,465,555 B2 | 6/2013 | Sherwood | |
| 8,913,368 B2 | 12/2014 | Hosoe et al. | |
| 9,446,475 B2 | 9/2016 | Norfolk et al. | |
| 9,656,344 B2 * | 5/2017 | Kironn | B23K 20/22 |
| 9,986,767 B2 | 6/2018 | Batista et al. | |
| 10,186,765 B2 | 1/2019 | Coleman et al. | |
| 10,194,723 B2 | 2/2019 | Skepton | |
| 11,292,211 B1 * | 4/2022 | Ito | B29C 65/08 |

(Continued)

FOREIGN PATENT DOCUMENTS

| | | | | |
|---|---|---|---|---|
| CN | 104396050 A * | 3/2015 | ........ | H01M 10/0413 |
| CN | 106862748 A * | 6/2017 | .......... | B23K 20/103 |

(Continued)

*Primary Examiner* — Kiley S Stoner
(74) *Attorney, Agent, or Firm* — Husch Blackwell LLP (57) ABSTRACT

The disclosure herein describes various methods for producing a composite thickness metal part. Such methods include cutting out a base component having a first thickness, cutting out a foil sheet having a second thickness less than the first thickness, and loading the base component and the foil sheet into a fixture. Then the methods include passing the fixture containing the base component and the foil sheet through an ultrasonic welding machine to join the foil sheet to the base component and form an interim part that includes the foil sheet joined to the base component and cutting away preselected sections of the foil sheet from the interim part to produce a final geometry of the composite thickness metal part.

18 Claims, 6 Drawing Sheets

(56) References Cited

U.S. PATENT DOCUMENTS

| | | | |
|---|---|---|---|
| 2006/0163315 A1* | 7/2006 | Delsman | B23K 20/106 228/1.1 |
| 2007/0110944 A1* | 5/2007 | Grandominico | B29C 66/721 428/57 |
| 2009/0136834 A1 | 5/2009 | Coowar et al. | |
| 2012/0088140 A1 | 4/2012 | Kardasz et al. | |
| 2012/0234593 A1* | 9/2012 | Bottenberg | H01L 31/049 174/268 |
| 2015/0155399 A1 | 6/2015 | Mu et al. | |
| 2015/0348895 A1 | 12/2015 | Sen et al. | |
| 2016/0164350 A1* | 6/2016 | Matsunaga | H02K 15/022 156/219 |
| 2018/0042779 A1* | 2/2018 | Lenser | B29C 65/74 |
| 2018/0279487 A1 | 9/2018 | Takamori | |
| 2018/0369953 A1* | 12/2018 | Miyashiro | B23K 20/106 |
| 2019/0009357 A1* | 1/2019 | Miyashiro | B23K 20/106 |
| 2019/0232430 A1 | 8/2019 | Gong et al. | |

FOREIGN PATENT DOCUMENTS

| | | | | |
|---|---|---|---|---|
| CN | 107405890 A | * | 11/2017 | B29C 65/08 |
| CN | 105751490 B | | 12/2017 | |
| CN | 107457804 A | * | 12/2017 | B26D 1/01 |
| CN | 111331239 A | * | 6/2020 | B23K 20/10 |
| CN | 111673261 A | * | 9/2020 | |
| CN | 112548306 A | * | 3/2021 | |
| CN | 112810160 A | * | 5/2021 | B29C 65/08 |
| EP | 0872301 A1 | * | 10/1998 | |
| JP | 07266422 A | * | 10/1995 | B29C 65/08 |
| JP | 2014526398 A | * | 10/2014 | |
| KR | 200389581 Y1 | * | 7/2005 | |
| KR | 100614501 B1 | * | 8/2006 | |
| KR | 20150018930 A | | 2/2015 | |
| WO | WO-2014181677 A1 | * | 11/2014 | B23K 20/10 |
| WO | WO-2020092772 A1 | * | 5/2020 | B23K 11/115 |

* cited by examiner

SYSTEMS AND METHODS FOR MAKING A COMPOSITE THICKNESS METAL PART

FIELD

The present invention generally relates to metal part manufacturing. More particularly, the present invention relates to systems and methods for making a composite thickness metal part.

BACKGROUND

In recent years, demand for electric vehicles, other battery powered devices, and electrically powered systems has increased the need for the design and manufacture of composite thickness metal parts that can be used as buss bars and other electrical components. Existing methods of manufacturing such parts are wasteful, inefficient, and or ineffective. Further, these prior methods produce a finished part that has a high level of electrical inefficiency and/or electrical resistance. For example, current known processes for constructing composite thickness metal parts have employed mechanical methods such as mechanical fasteners and/or welding methods using laser welding, and/or brazing. These methods, however, create narrow and weak welds with a limited cross-sectional area. These limitations are detrimental in complex electrical applications. In particular, a small cross-sectional area is detrimental as it can increase resistance and generate heat when a significant amount of current is pushed through such a location.

In view of the above, there is a continuing, ongoing need for improved systems and methods for making composite thickness metal parts.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Figure 1:
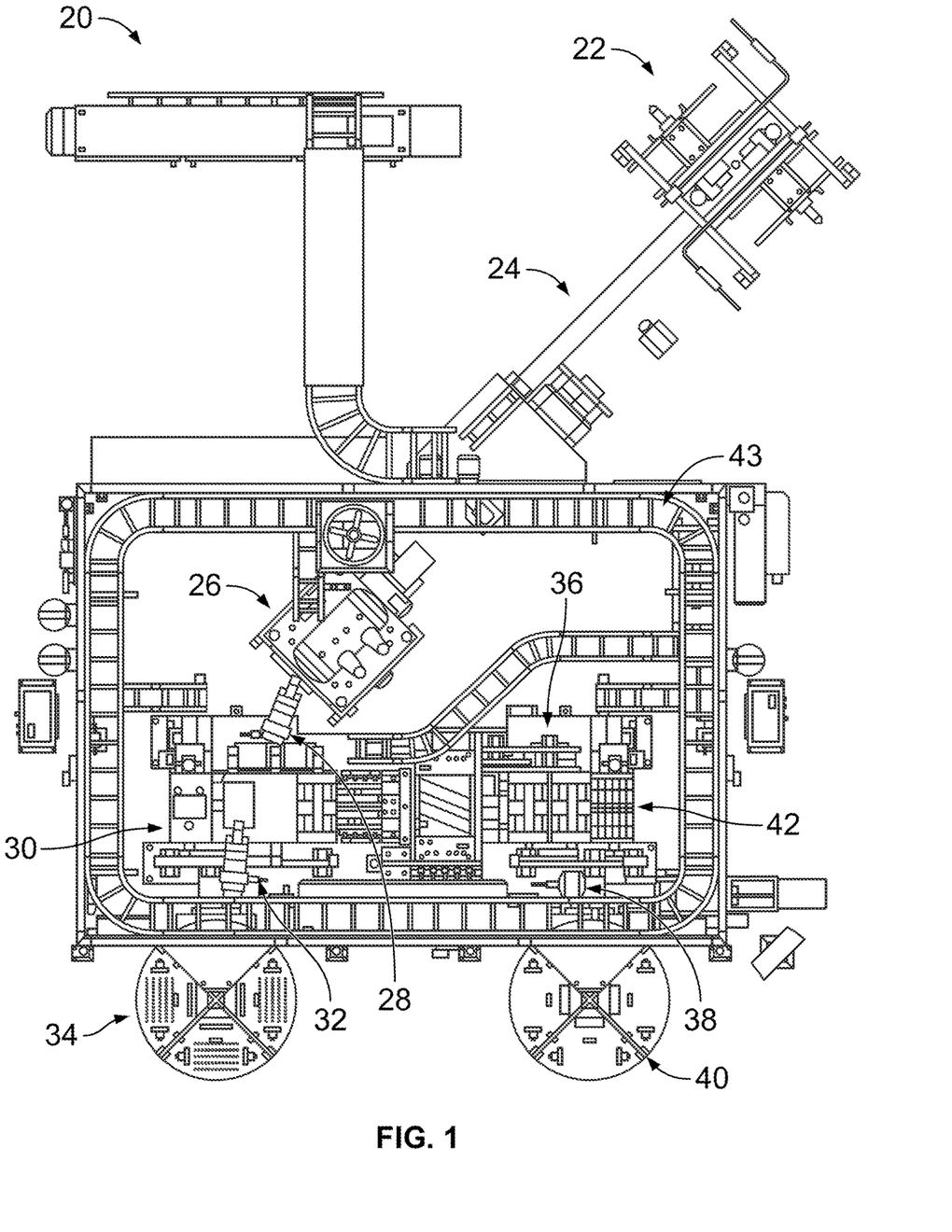
FIG. 1 is a schematic view of an assembly line system for implementing methods for producing composite thickens metal parts according to disclosed embodiments.

Embodiments disclosed herein can include various methods and related systems for making a composite thickness metal part. FIG. 1 shows an assembly line system 20 for use in accomplishing one or more of the methods disclosed herein. As seen in FIG. 1, the assembly line system 20 can include multiple different stations. First, the assembly line system 20 can include a foil roll processing station 22 configured to unroll a spool of metallic foil into a contiguous foil sheet 24. Second, the assembly line system 20 can include a stamp pressing station 26 configured to cut out a foil sheet 50 (see FIG. 3) from the contiguous foil sheet 24. Third, the assembly line system 20 can include a first robot arm 28 configured to move the cut out foil sheet 50 from the stamp pressing station 26 onto a base component 44 (see FIG. 2) within a fixture 52 (see FIG. 4) at a fixture loading station 30. Fourth, the assembly line system 20 can include a second robot arm 32 configured to move the base component 44 from a first staging area 34 into the fixture 52 at the fixture loading station 30. Fifth, the assembly line system 20 can include an ultrasonic welding machine 36 configured to join the foil sheet 50 to the base component 44. Sixth, the assembly line system 20 can include a third robot arm 38 configured to move the joined foil sheet 50 and base component 44 to a second staging area 40. The assembly line system 20 can also include a fixture recirculator 42 configured to recirculate the empty fixture back to the fixture loading station 30. In some embodiments, the assembly line system 20 can also include a sound dampening enclosure 43 that surrounds the portion of the assembly line system 20 that includes the ultrasonic welding machine 36. In some embodiments, the enclosure 43 can include a top section that completely closes off the portion of the assembly line system 20 that includes the ultrasonic welding machine 36.

Figure 2:
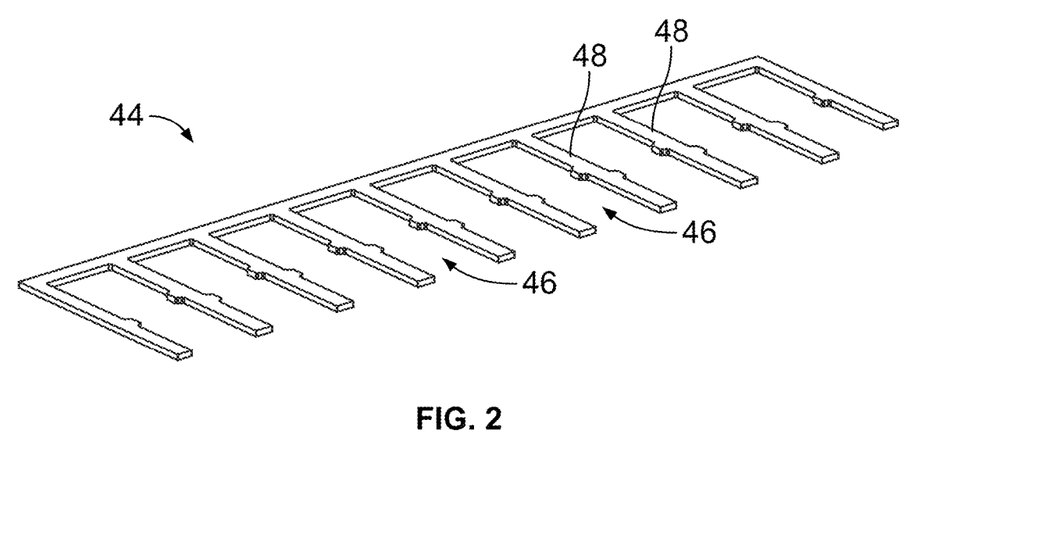
FIG. 2 is a perspective view of a base component according to disclosed embodiments.

FIG. 2 is a perspective view of the base component 44 produced according to various methods disclosed herein. As seen in FIG. 2, the base component 44 can include a metal part having a first thickness and including a plurality of fingers 48 and a plurality of channels 46 disposed between respective ones of the plurality of fingers 48. Various different materials for the base component 44 are contemplated, including but not limited to ferrous or non-ferrous metals including dissimilar metals such as copper and aluminum. In addition, the invention is not limited to the configuration of the base component in FIG. 2. The methods described herein can also be utilized to produce composite thickness metal parts with other configurations of the base component. In some embodiments, the base component 44 can include a current collecting busbar.

Figure 3:
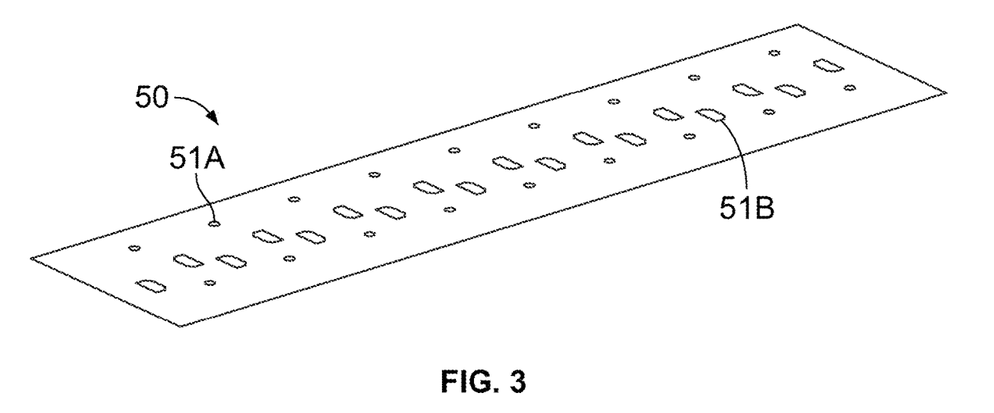
FIG. 3 is a perspective view of a precut foil sheet according to disclosed embodiments.

FIG. 3 is a perspective view of the foil sheet 50 that, in some embodiments, is cut out from the contiguous foil sheet 24 shown in FIG. 1. As seen in FIG. 3, the foil sheet 50 can have a second thickness that is less that the first thickness of the base component 44. In some embodiments, the second thickness of the foil sheet 50 can be approximately between 2 and 5 thousandth of an inch. In some embodiments, the base component 44 can include a minimum thickness that is greater than the second thickness. Furthermore, as seen in FIG. 3, the foil sheet 50 can include a first plurality of holes 51A configured to assist in locating the foil sheet 50 on the fixture 52 and a second plurality of holes 51B configured to provide clearance for downstream tooling. In some embodiments, the foil sheet 50 can include exterior notches which can be configured to provide additional clearance for downstream tooling and are pre-removed section of undesired foil which can be vestigial in the final part geometry.

Figure 4:
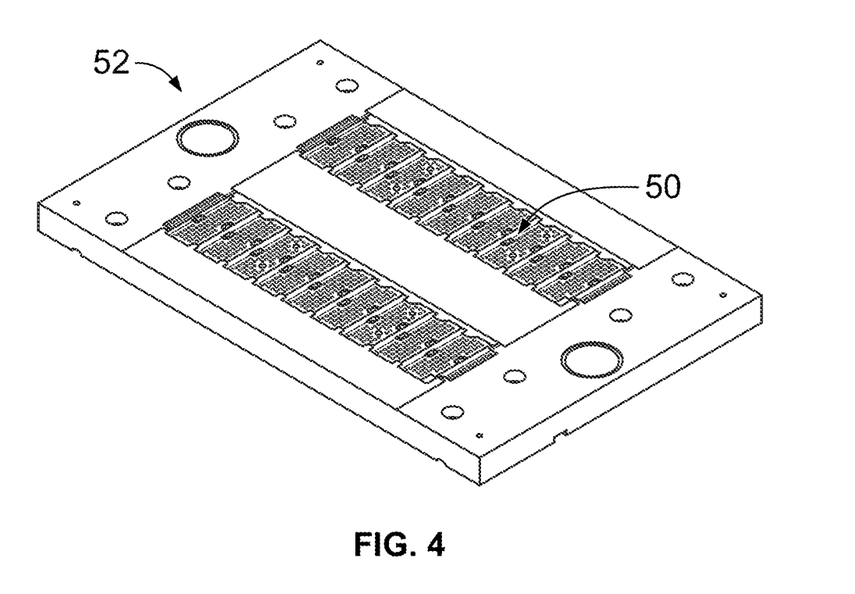
FIG. 4 is a perspective view of fixture according to disclosed embodiments.
Figure 5:
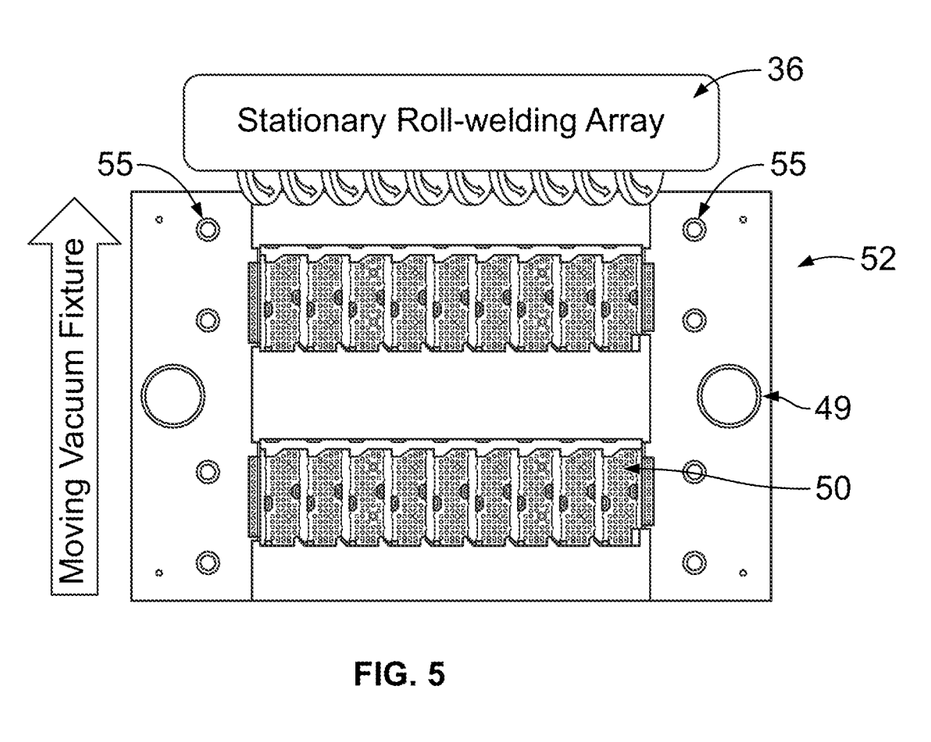
FIG. 5 is a partial schematic view of one portion of an assembly line according to disclosed embodiments.

FIG. 4 is a perspective view of the fixture 52 according to disclosed embodiments. As seen in FIG. 4, the fixture 52 can be configured to secure the foil sheet 50 in a preconfigured orientation on top of the base component 44 with a holding function. In some embodiments, the fixture 52 can be constructed from aluminum, which can provide substantial weight savings. Furthermore, as seen in FIG. 5, in some embodiments, the fixture 52 can include identification areas 55. In some embodiments, the identification areas 55 can include color coded markers that signify an orientation and the base component 44 with which they are associated. In some embodiments, the fixture 52 can be configured to accommodate at least 2 base components 44. However, embodiments that accommodate both fewer than two and greater than 2 base components 44 are also contemplated.

In some embodiments, such as shown in FIG. 5, the holding function can include a vacuum function that, when activated, sucks the base component 44 and the foil sheet 50 into the fixture 52 to secure the base component 44 and the foil sheet 50 in the preconfigured orientation. Once secured in this preconfigured orientation, in an embodiment, the fixture is passed under or through the ultrasonic welding machine 36. In some embodiments, the vacuum can originate from a central vacuum pump (not shown) and be pulled from beneath the fixture 52 through the plurality of air holes 55. Additionally or alternatively, in some embodiments, the holding function can include a clamping function that when activated can clamp the base component 44 and the foil sheet 50 together within the fixture 52 to secure the base component 44 and the foil sheet 50 in the preconfigured orientation prior to passing the fixture is passed under or through the ultrasonic welding machine 36. In some embodiments, the assembly line system 20 can be configured to accommodate approximately nine fixtures 52 being rotated though the ultrasonic welding machine 36 at various intervals. In some embodiments, the fixtures can be driven through the assembly line system 20 by a chain drive that loops from the fixture loading station 30, through the ultrasonic welding machine 36, to the fixture recirculator 42, and back to the fixture loading stations 30.

Figure 6:
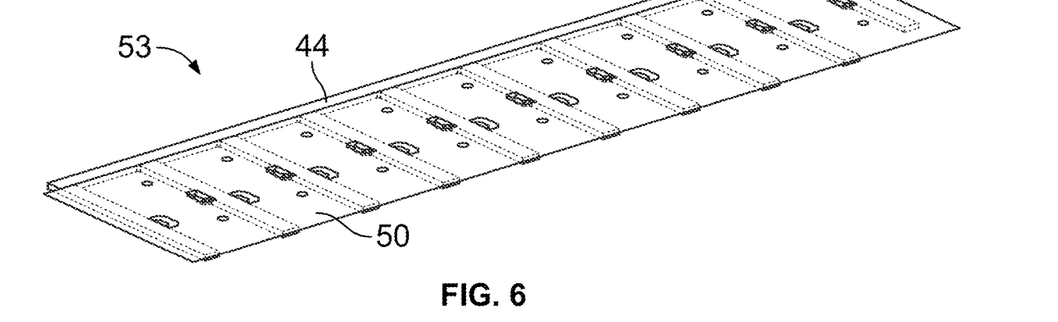
FIG. 6 is perspective view of an interim part according to disclosed embodiments.

FIG. 6 is a perspective view of an interim part 53 showing the foil sheet 50 welded to the base component 44 by the ultrasonic welding machine 36. As discussed in more detail below, in some embodiments, the ultrasonic weld produced according to the methods described herein can be a stronger bond with less electrical resistance than bonds produced by other known methods for joining a foil sheet to a base component (e.g. the prior art mechanical methods and welding methods discussed above). In some embodiments, the interim part 53 can include a current collector weld.

In some embodiments, the ultrasonic welding machine 36 can include ten distinct weld heads in a banked formation that output a continuous weld process as the fixture 52 is passed through the ultrasonic welding machine 36. In some embodiments, the weld heads can be aligned with each of the plurality of fingers 48 so as to create wider and stronger welds than previously known methods. Furthermore, in some embodiments, the continuous weld process can maximize the area of weld surface between the foil sheet 50 and the base component 44 to produce a strong bond with low electrical resistance for use in various battery or other electrical component applications. According to disclosed embodiments, the ultrasonic welding machine 36 can include one or more settings that can be adjusted to produce a low electrical resistance ultrasonic weld as described herein. In some embodiments, these adjustable setting can include the feed-rate, amplitude, and head pressure, each of which can be adjusted based on part geometry (including thickness) and base material. In some embodiments, changes to the adjustable settings can be identified by testing the ultrasonic bond via a destructive peel/pull-test and/or thermal imaging of the final assembly under electrical load to detect "hot spots" and identify any areas of high resistance. In some embodiments, only one pass of the fixture 52 is needed through the ultrasound welding machine 36 to weld the foil sheet 50 and the base component 44 together with a strong bond. In some embodiments, one pass forward and one pass backward of the fixture 52 through the ultrasound welding machine 36 can be made. In another embodiment, more than one pass forward and backward of the fixture 52 through the ultrasound welding machine 36 can be made.

Figure 7:
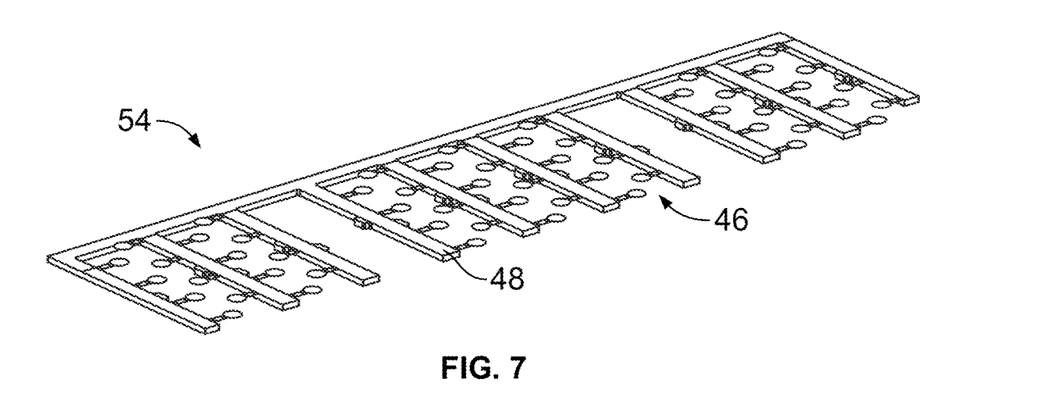
FIG. 7 is a perspective view of a mostly final geometry of a composite thickness metal part according to disclosed embodiments.
Figure 8:
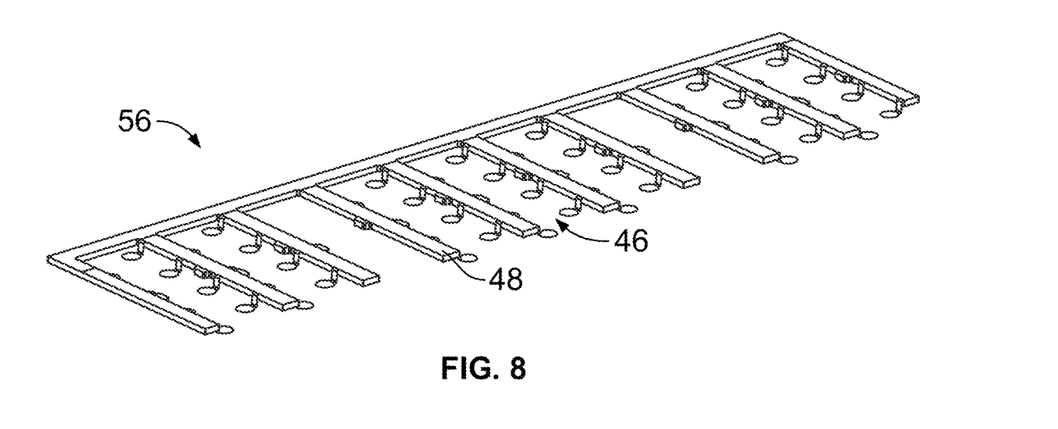
FIG. 8 is a perspective view of a final geometry of a composite thickness metal part according to disclosed embodiments.

FIG. 7 is perspective view of an interim composite thickness metal part 54 having a mostly final geometry after preselected sections of the foil sheet 50 are removed from the interim part 53. As seen in FIGS. 6-7, the foil sheet 50 can be joined to an upper surface of each of the plurality of fingers 48 and the preselected sections of the foil sheet 50 can include portions of the foil sheet 50 that overlap with the plurality of channels 46 in a final geometry of the composite thickness metal part. Furthermore, FIG. 8 is a perspective view of a final geometry composite thickness metal part 56 according to disclosed embodiments. As seen in FIGS. 7-8, the interim composite thickness metal part 54 can be modified into the final geometry composite thickness metal part 56 by trimming away and/or bending sections of the foil sheet 50 that remain within the plurality of channels 46. In some embodiments where the composite thickness metal part 56 is used as a buss bar for battery systems, the sections of the foil sheet 50 that remain within the plurality of channels 46, such as the circular foil sections shown in FIG. 8, can serve as electrical contacts.

Figure 9:
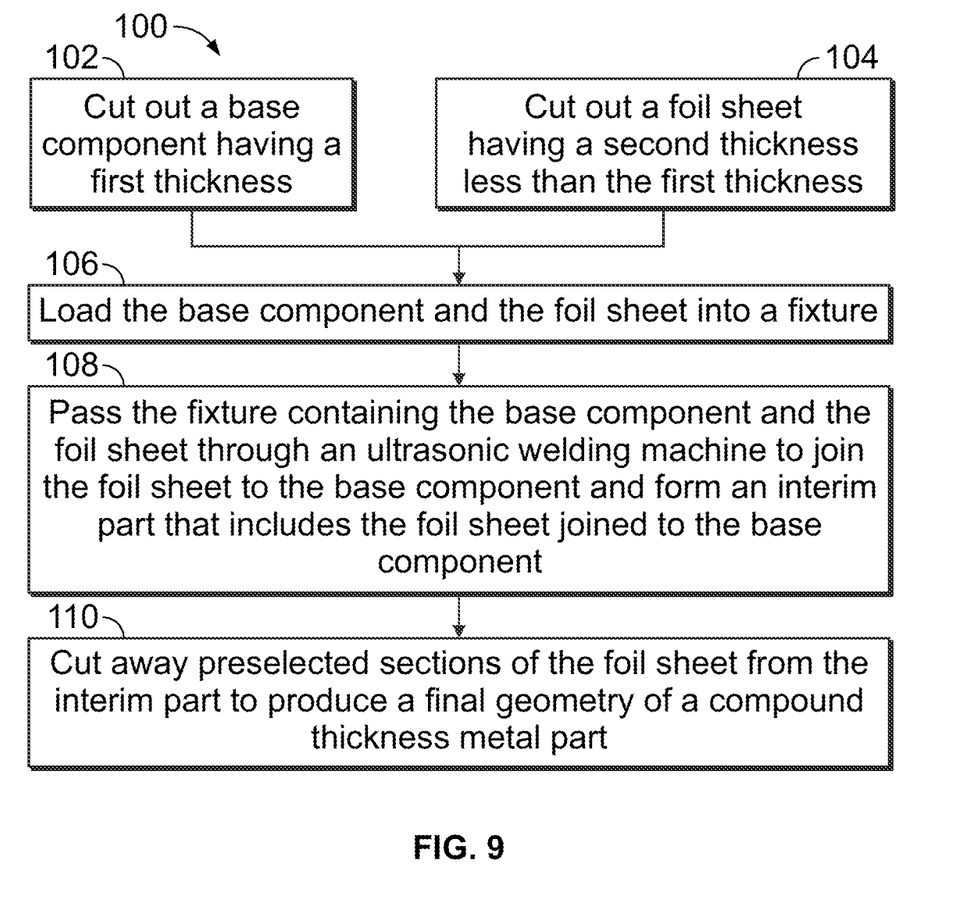
FIG. 9 is a flow diagram of a method according to disclosed embodiments.

FIG. 9 is a flow diagram of a method 100 for making the composite thickness metal part 56. As seen in FIG. 9, the method 100 can include cutting out the base component 44, as in 102. In some embodiments, cutting out the base component 44 can include stamp cutting the base component 44 from a piece of stock metal material having the first thickness of the base component 44. In some embodiments, the base component 44 can be stamp cut at a stamp cutting station (not shown in FIG. 1) that is either integrated into the assembly line system 20 or separate from the assembly line system 20.

As seen in FIG. 9, the method 100 can also include cutting out the foil sheet 50, as in 104. In some embodiments, cutting out the foil sheet 50 can include unrolling the spool of foil into the contiguous foil sheet 24 at the foil roll processing station 22 and stamp cutting the foil sheet 50 from the contiguous foil sheet 24 at the stamp pressing station 26. In some embodiments, the contiguous foil sheet 24 has the same second thickness as the foil sheet 50.

As seen in FIG. 9, after cutting out the base component 44 and the foil sheet 50, the method 100 can include loading the base component 44 and the foil sheet 50 into the fixture 54, as in 106. In some embodiments, the base component 44 and the foil sheet 50 can be loaded into the fixture 52 at the fixture loading station 30 using the first and second robot arms 32 and 28 respectively and then activating the holding function, such as by vacuum, of the fixture 54 to secure the base component 44 and the foil sheet 50 in the preconfigured orientation. In embodiments where the holding function includes the vacuum function, a vacuum ($1b$/Mg) sensor/meter can be used to detect whether the foils sheet and the base component have been properly aligned in the fixture 50.

Then, the method 100 can include passing the fixture 52 containing the base component 44 and the foil sheet 50 from the fixture loading station to the ultrasonic welding machine 36, where the ultrasonic welding machine 36, utilizing one or more of the adjustable settings described above, joins the foil sheet 50 to the base component 44, through one of more welding passes, and forms the interim part 53 that includes the foil sheet 50 joined to the base component 44, as in 108.

After forming the interim part 53, the method 100 can include removing the interim part 53 from the assembly line system 30 such as to the staging area 40, moving the interim part 53 to a cutting and trimming station (not shown in FIG. 1), cutting away the preselected sections of the foil sheet, and successively trimming and bending the remnants to form first the interim composite thickness metal part 54 and then the composite thickness metal part 56, as in 110. In some embodiments, a visual sensor such as a camera or similar can be used to detect that the interim part 53 has been properly removed from the assembly line system 20.

Figure 10:
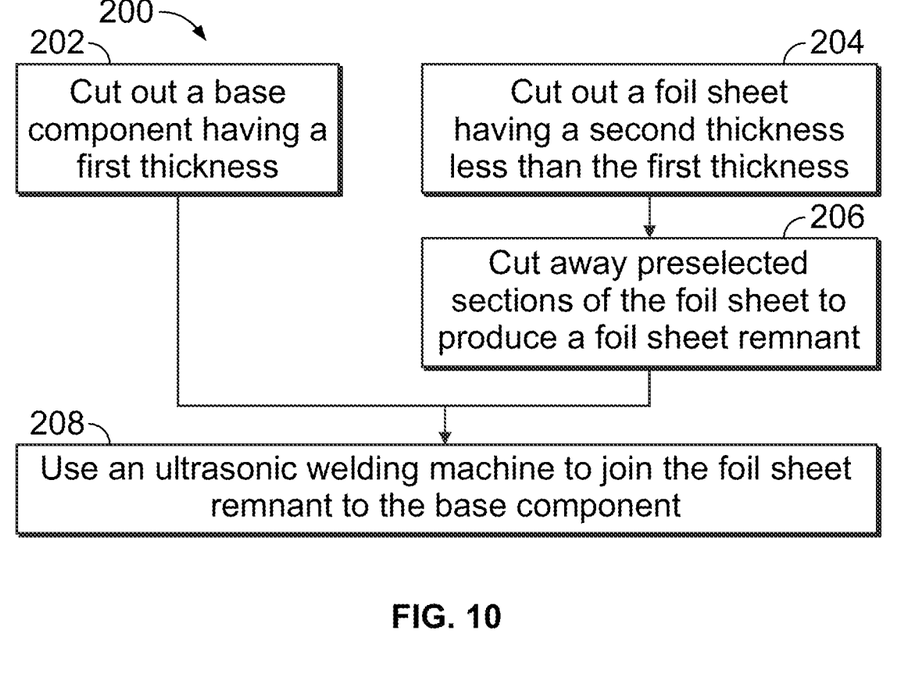
FIG. 10 is a flow diagram of a method according to disclosed embodiments.

Additional methods for producing the composite thickness metal part 56 are also contemplated. For example, FIG. 10 shows another method 200 for producing the composite thickness metal part 56. As seen in FIG. 10, the method 200 can include cutting out the base component 44, as in 202. Furthermore, the method 200 can include cutting out the foil sheet 50, as in 204, and then cutting away the preselected sections of the foil sheet 50 to produce a foil sheet remnant or a pre-stamped foil, as in 206. In some embodiments, the foil sheet remnant can include only the portions of the foil sheet 50 that are present in the interim composite thickness metal part 54 and/or the composite thickness metal part 56. After cutting out the base component 44 and the foil sheet remnant, the method 200 can include using the ultrasonic welding machine 36 to join the foil sheet remnant to the base component 44, as in 208.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method for producing a composite thickness metal part comprising:
    cutting out a base component such that the base component includes a plurality of fingers and a plurality of channels, wherein each of the plurality of channels are disposed between respective ones of the plurality of fingers, the base component having a first thickness;
    cutting out a foil sheet, the foil sheet having a second thickness less than the first thickness;
    loading the base component and the foil sheet into a fixture;
    passing the fixture containing the base component and the foil sheet through an ultrasonic welding machine to join the foil sheet to the base component and form an interim part that includes the foil sheet joined to the base component; and
    cutting away preselected sections of the foil sheet from the interim part to produce a final geometry of the composite thickness metal part.

2. The method of claim 1 wherein using the ultrasonic welding machine to join the foil sheet to the base component includes joining the foil sheet to an upper surface of each of the plurality of fingers.

3. The method of claim 2 wherein the preselected sections of the foil sheet include portions of the foil sheet that overlap with the plurality of channels.

4. The method of claim 3 further comprising cutting away the preselected sections of the foil sheet from the interim part to produce the final geometry of the composite thickness metal part such that the final geometry includes sections of the foil sheet located within one or more of the plurality of channels.

5. The method of claim 1 wherein cutting out the base component includes stamp cutting the base component from a piece of stock material having the first thickness.

6. The method of claim 1 wherein cutting out the foil sheet includes stamp cutting the foil sheet from a roll of foil having the second thickness.

7. The method of claim 1 further comprising, activating a holding function of the fixture to secure the base component and the foil sheet in a preconfigured orientation while the fixture is passed through the ultrasonic welding machine.

8. The method of claim 7 wherein the holding function includes a vacuum function that when activated sucks the base component and the foil sheet into the fixture to secure the base component and the foil sheet in the preconfigured orientation.

9. The method of claim 7 wherein the holding function includes a clamping function that when activated clamps the base component and the foil sheet together within the fixture to secure the base component and the foil sheet in the preconfigured orientation.

10. A method for producing a composite thickness metal part comprising:
    cutting out a base component such that the base component includes a plurality of fingers and a plurality of channels, wherein each of the plurality of channels are disposed between respective ones of the plurality of fingers, the base component having a first thickness;
    cutting out a foil sheet, the foil sheet having a second thickness less than the first thickness;
    cutting away preselected sections of the foil sheet to produce a foil sheet remnant; and
    using an ultrasonic welding machine to join the base component to the foil sheet remnant.

11. The method of claim 10 wherein using the ultrasonic welding machine to join the foil sheet remnant to the base component includes joining the foil sheet remnant to an upper surface of each of the plurality of fingers.

12. The method of claim 11 wherein the preselected sections of the foil sheet include portions of the foil sheet that overlap with the plurality of channels in a final geometry of the composite thickness metal part, and wherein the final geometry includes sections of the foil sheet remnant located within one or more of the plurality of channels.

13. The method of claim 10 wherein cutting out the base component includes stamp cutting the base component from a piece of stock materials having the first thickness.

14. The method of claim 10 wherein cutting out the foil sheet includes stamp cutting the foil sheet from a roll of foil having the second thickness.

15. The method of claim 10 further comprising:
    loading the base component and the foil sheet remnant into a fixture; and passing the fixture containing the base component and the foil sheet remnant through the ultrasonic welding machine to join the foil sheet to the base component.

16. The method of claim 15 further comprising, activating a holding function of the fixture to secure the base component and the foil sheet remnant in a preconfigured orientation while the fixture is passed through the ultrasonic welding machine.

17. The method of claim 16 wherein the holding function includes a vacuum function that when activated sucks the base component and the foil sheet remnant into the fixture to secure the base component and the foil sheet in the preconfigured orientation.

18. The method of claim 16 wherein the holding function includes a clamping function that when activated clamps the base component and the foil sheet remnant together within the fixture to secure the base component and the foil sheet remnant in the preconfigured orientation.

* * * * *